(12) United States Patent
Wagner et al.

(10) Patent No.: US 7,481,309 B2
(45) Date of Patent: Jan. 27, 2009

(54) METHOD OF SEPARATING, SYNCHRONIZING AND COMPACTING PACKED GROUPS OF ARTICLES

(75) Inventors: Stefan Wagner, Xanten (DE); Stefan Willemsen, Weeze (DE); Bernd Cox, Weeze (DE); Manfred Van Triel, Xanten (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 11/828,883

(22) Filed: Jul. 26, 2007

(65) Prior Publication Data

US 2008/0047231 A1 Feb. 28, 2008

Related U.S. Application Data

(63) Continuation of application No. 10/962,183, filed on Oct. 8, 2004, now abandoned.

(30) Foreign Application Priority Data

Oct. 10, 2003 (DE) ............................. P 103 47 540

(51) Int. Cl.
*B65G 47/26* (2006.01)
(52) U.S. Cl. ............. 198/419.3; 198/418.1; 198/419.1; 198/429; 198/459.7
(58) Field of Classification Search ............. 198/418.1, 198/419.1, 419.3, 429, 459.7
See application file for complete search history.

(56) References Cited

U.S. PATENT DOCUMENTS

| | | | | |
|---|---|---|---|---|
| 3,194,382 A | * | 7/1965 | Nigrelli et al. | 198/418.1 |
| 5,020,655 A | * | 6/1991 | Cruver | 198/419.3 |
| 5,271,709 A | * | 12/1993 | VanderMeer et al. | 414/791.7 |
| 5,547,004 A | * | 8/1996 | Fransen | 198/419.3 |
| 5,667,055 A | * | 9/1997 | Gambetti | 198/419.3 |
| 5,893,701 A | * | 4/1999 | Pruett | 414/798.2 |
| 6,182,814 B1 | * | 2/2001 | Koehler | 198/418.7 |
| 6,321,896 B1 | * | 11/2001 | Zuccheri et al. | 198/419.1 |
| 6,360,872 B1 | * | 3/2002 | Guidetti | 198/419.1 |
| 7,134,258 B2 | * | 11/2006 | Kalany et al. | 53/473 |

* cited by examiner

*Primary Examiner*—Douglas A Hess
(74) *Attorney, Agent, or Firm*—Nils H. Ljungman & Associates

(57) ABSTRACT

A beverage bottling plant for filling bottles with a liquid beverage filling material, having a separating and compacting device for packing articles of all types with at least one circulating pair of drive elements, with at least one crossbar that is located on each pair of drive elements, with one controlled drive motor for each pair of drive elements, whereby the device is designed and constructed so that the separation and compacting of the articles are performed by the at least one pair of drive elements.

20 Claims, 8 Drawing Sheets

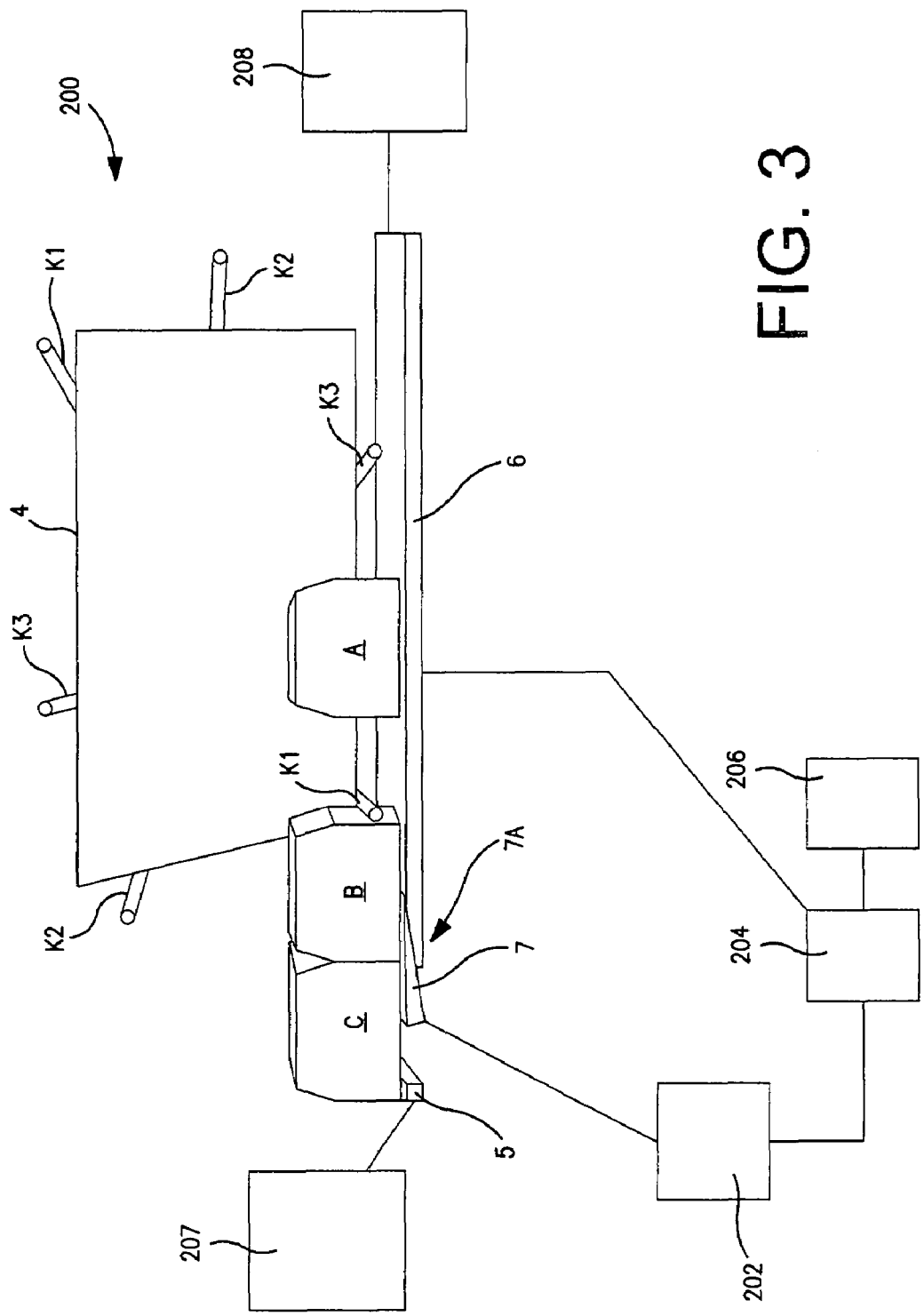

METHOD OF SEPARATING, SYNCHRONIZING AND COMPACTING PACKED GROUPS OF ARTICLES

This application is a continuation of U.S. patent application Ser. No. 10/962,183, filed Oct. 8, 2004, which was pending at the time of filing of this application and is presently abandoned.

BACKGROUND

1. Technical Field

This application relates to a beverage bottling plant for filling bottles with a liquid beverage filling material, a beverage container filling machine, a beverage container closing machine, and a beverage container packaging machine. The present application further relates to a device for the separation and compacting of articles as described herein below.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyor arrangement that is designed to move bottles, for example, from an inspecting machine to the filling machine. Upon filling, a closing station closes the filled bottles. There may further be provided a conveyor arrangement configured to transfer filled bottles from the filling machine to the closing station. Bottles may be labeled in a labeling station, the labeling station having a conveyor arrangement to receive bottles and to output bottles. The closing station and the labeling station may be connected by a corresponding conveyor arrangement.

Devices of this type are required inside packing machines to form and/or separate individual groups or articles or articles from article streams that arrive in uninterrupted rows and which are then to be packed in boxes, cases, trays and/or shrink-wrap.

This packing process consists of a plurality of subprocesses, whereby the prior art uses individual machines, or at least individual, self-contained assemblies or modules to perform these subprocesses.

First the article stream, which can comprise containers or commodities of all types such as bottles, bags, cans, boxes, bags etc., for example, is fed to the separating device by a conveyor.

This conveyor is generally a device that is equipped with a wide conveyor belt and is also equipped with guides made of sheet metal, whereby these guides form alleys that are located above the conveyor belt.

These alleys in turn separate the incoming article stream, which initially arrives in an unorganized manner, into rows.

By means of a suitable separating device, this stream of articles standing pushed up against one another in the individual alleys is divided into the desired amount or number of articles, whereby the amount or number of articles is determined by multiplying the number of rows in the direction of travel by the number of rows at a right angle to the direction of travel. The separated rows in the direction of travel, in connection with the rows that run at right angles to the direction of travel, result in the format which is then to be packaged.

To make it at all possible to package the format generated, it is necessary to create a space between the format that has just been generated and the stream of articles behind it. This gap is generally created by continuing to move the stream of articles forward at an unchanged speed, while the format generated is transported onward at an increased speed.

The next step in the process represents what is termed the compacting step, and the purpose of which is to close any gaps that have been created inside the format by the guides and by potential displacements of the articles in relation to one another. For this purpose the format is moved by means of a suitable device through tapering outside guides, as a result of which any gaps produced by the guides are closed. Simultaneously, but also subsequently, the format is pushed off the conveyor and onto a stationary plate, as a result of which any spaces that still exist in the direction of travel inside the rows can also be closed.

An additional important function that is performed during the compacting is the positioning of the formats at the correct intervals and/or the synchronization of the format with the machine clock rate. This function is necessary because repeated displacements in all dimensions can occur as a result of the upward, downward and forward movement of the articles or the format by or toward mobile or stationary device components, as a result of which the format may not be in the location where it is supposed to be according to the planned sequence of movements.

The format compacted in the manner described above is then packaged.

To realize the sequences described above, numerous teachings have been presented in the prior art, although one thing that all the teachings of the prior art have in common is that individual, self-contained assemblies are used at least for the separation and compacting/synchronization, which results in a complex and therefore expensive design and construction.

Devices of the prior art are also very large on account of the numerous modules they comprise.

A device of the prior art was described in DE 695 00 173, for example. On this device, individual series of articles in the stream of articles are first separated by finger-shaped elements that are inserted from below into the stream of articles and are then transported forward. The synchronization device then drops down from above between the separated rows of articles and begins to push and thereby synchronize them.

This synchronization device thereby comprises synchronously driven parallel chains running on both sides of the container flow, whereby a plurality of bars are located on these chains so that the rods run at a right angle to the direction of transport and thus drive and synchronize the articles by their forward movement.

One special characteristic of this device is that, at the beginning of the synchronization, two pairs of chains are engaged with each other, as a result of which each individual row of articles is individually transported by a single transverse bar. After traveling a certain distance, one of the two chain pairs is removed from the article stream, so that during the rest of the travel, only the remaining chain pair performs the subsequent compacting and synchronization, which also means that a plurality of transverse rows (rows of articles at a right angle to the direction of travel) are transported by one transverse bar, as a result of which the actual format is ultimately formed.

One disadvantage of such a device is that the format produced can only be changed by installing or removing numerous transverse bars. Moreover, as a result of the engagement of the two chain pairs and the other design features of the device, not all desired formats can be produced.

U.S. Pat. No. 3,194,382 describes another device of the prior art. On this device, during the separation process, all the transverse rows required for a format are separated directly and all at once from the article stream. In this device of the prior art, the separation is also performed by elements that are inserted into the article stream from below. The synchronization and compacting are done by a chain pair that is located above the transport plane, which is also provided with cross bars. This device also has the major disadvantage that changes to the format can only be made by extensive conversion measures, in particular of the separating unit, where in addition to replacing the chains that are being used, it is also necessary to transfer, move or replace the corresponding chain pulleys.

An additional device of the prior art is described in DE 298 07 979. This device also works with individual components for the separation and synchronization/compacting, whereby a special device is proposed to separate the articles into groups. For the separator unit, instead of the guide plates of the prior art, guide rails are provided, whereby said guide rails are provided in sufficient number that each longitudinal row of articles is enclosed on both sides by guide rails. These guide rails are realized in the form of two complete sets, whereby each set is located in its own vertical plane, and whereby these sets are arranged on two vertical levels, one above the other.

On each guide rail there is a linear sled or slide, which is provided with retaining levers that can be extended and retracted.

Each of these linear sleds is driven by a drive chain that is connected with it, whereby all the linear sleds of one set or on one vertical level are driven and moved synchronously by a common servomotor.

Because the linear sleds of the different sets are located on different vertical levels, they can be moved forward and backward completely independently of one another.

The groups of articles are divided by having a first set of linear sleds with the retaining levers extended realize a forward motion, and thereby holding back the moving article stream with respect to the conveyor belt, which is moving at a higher speed. Simultaneously, a second set of linear sleds with the retaining levers retracted executes a reverse movement.

When this second set of linear sleds has reached the terminal point of the reverse movement, the retaining levers are extended, as a result of which one group of articles is separated from the stream of articles. If the retaining levers are extended, the first set of linear sleds, by retracting its retaining levers, releases the leading edge of the group of articles just formed, so that the group just formed is then transported at the higher speed of the conveyor belt, and a space is therefore formed between the group of articles and the following article stream, which is held back by the second set of linear sleds.

The subsequent compacting/synchronization of the group of articles occurs in a separate device in the known manner.

One disadvantage of such a device is that the stream of articles, which is in most cases already quite cohesive, must first be separated to some extent, because the linear sleds must be inserted between the individual longitudinal rows. Additional problems result from this arrangement, because in the process of compacting, very large gaps must be reduced, which can result in tipping, especially when the articles are sensitive to tipping, which is extremely undesirable in practice.

The processing of articles that have rectangular cross sections also presents major problems, because a continuous external surface is formed when a plurality of such articles are jammed up against one another, as a result of which there is no suitable point of insertion for the retaining lever.

The mechanical complexity and expense of such a device are additional disadvantages.

OBJECT OR OBJECTS

An object of the present application is to eliminate the disadvantages described above and to create a device that makes it possible to significantly reduce the costs involved, the number of components required and the amount of space occupied. The present application teaches that the separating unit and the compacting/synchronization unit are combined into a single unit.

The embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Embodiments of the present application are explained in greater detail below with reference to the exemplary embodiments that are illustrated in the accompanying drawings, in which:

FIG. 3 is similar to FIG. 2a, and shows further detail according to one possible embodiment.

Developments, advantages and potential applications of the embodiments are explained in greater detail below, with reference to the exemplary embodiments and the accompanying drawings. The object of the present application includes all the features described and/or illustrated, individually or in any desired combination, regardless of their combination in the claims or the references to other claims. The text of the claims is likewise incorporated by reference into this description.

DESCRIPTION OF EMBODIMENT OR EMBODIMENTS

Figure 1A:
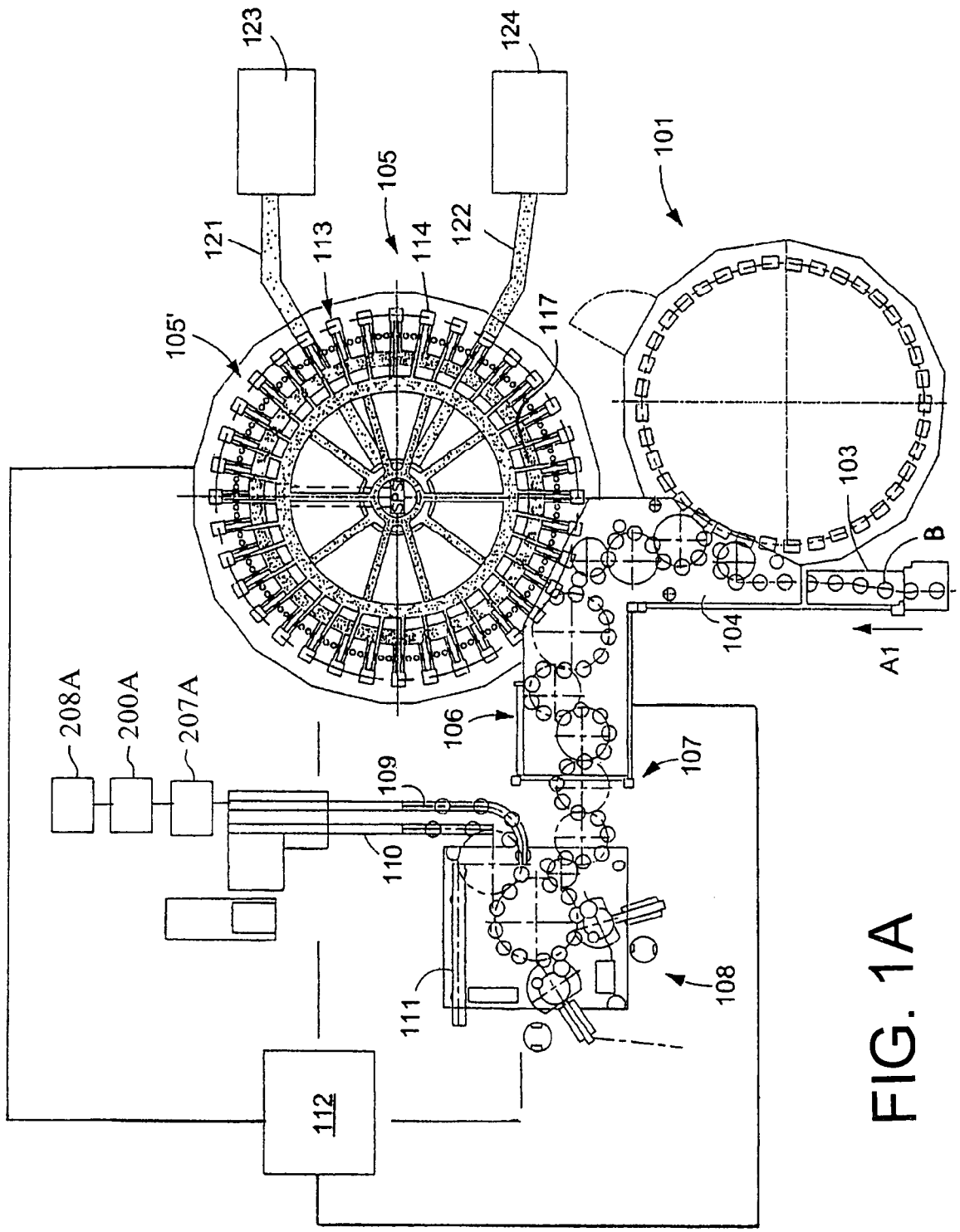
FIG. 1A is a schematic illustration of a container filling plant in accordance with one possible embodiment.

FIG. 1A shows schematically the main components of one embodiment example of a system for filling containers, specifically, an embodiment of a beverage bottling plant 100 for filling bottles B with liquid beverage filling material, in accordance with one embodiment, or in which system or plant could possibly be utilized at least one aspect, or several an aspects, of the embodiments disclosed herein.

FIG. 1A shows a rinsing arrangement or rinsing station 101, to which the containers, namely bottles B, are fed in the direction of travel as is indicated by the arrow A1, by means of a conveyor line or conveyor arrangement to feed bottles to rinsing arrangement 103, and downstream of rinsing arrangement or rinsing station 101, in the direction of travel as is indicated by the arrow A1, the rinsed bottles B are transported to a beverage filling machine 105 by means of a conveyor line or conveyor arrangement 104 to pass bottles to filling machine that is formed, for example, by a starwheel conveyor or a plurality of starwheels of a conveyor arrangement. The conveyor arrangement 104 to pass bottles to filling machine may possibly comprise a starwheel conveying structure that introduces bottles B to the filling machine 105.

Downstream of the filling machine 105, in the direction of travel of the bottles B, there can preferably be a closing arrangement or closing station 106 which closes the bottles B.

The closing arrangement or closing station 106 can, for example, be connected directly to a labeling arrangement or labeling station 108 having at least one labeling unit, device, or module for first product, each unit having a head, such as, for example, by means of a conveyor arrangement 107 to pass bottles to labeling arrangement that may be formed, for example, by a plurality of starwheels of a conveyor arrangement.

In the illustrated embodiment, the labeling arrangement or labeling station 108 having at least one labeling unit, device, or module for first product, each unit having a head has, for example, three outputs, namely one output formed by a conveyor arrangement 109 to convey first product bottles for bottles B that are filled with a first product. The first product may possibly be provided by a first product mixer 123 that is connected to the filling machine 105, for example, through a conduit for first product 121, and bottles B that are filled with a predetermined volume of liquid beverage filling material, that is, the first product, are then labeled by a labeling module in the labeling arrangement or labeling station 108 having at least one labeling unit, device, or module for first product, each unit having a head, corresponding to this first product delivered from first product mixer 123 to the beverage filling machine 105 and thence to the corresponding bottles B.

A second output that is formed by a conveyor arrangement 110 to convey second product bottles is provided for those bottles B that are filled with a second product. The second product may emanate from a second product mixer 124 that is connected, for example, through a conduit for second product 122 to the filling machine 105, and these bottles B filled with a predetermined volume of liquid beverage filling material comprising the second product are then correspondingly labeled by a labeling module in the labeling arrangement or labeling station 108 having at least one labeling unit, device, or module for first product, each unit having a head, corresponding to this second product.

A third output, for example, formed by a conveyor arrangement 111 to convey incorrectly labeled bottles, removes any bottles B which have been incorrectly labeled as may have been determined by an inspecting device or an inspecting station, or an inspecting module 128 that may possibly form a part of the labeling arrangement or labeling station 108 having at least one labeling unit, device, or module for first product, each unit having a head.

In FIG. 1A item 112 is a central control arrangement or, expressed differently, a controller with a computer to process algorithms, which controls the operation of the above-referenced system or plant.

The beverage filling machine 105 is preferably of the revolving design, with a rotor 105', which revolves around a vertical machine axis. The rotor 105' is designed to handle the bottles B by the neck. A filling arrangement 114 having at least one filling device, element, apparatus, or valve, comprises an apparatus configured to introduce a predetermined volume of liquid beverage filling material into the interior of bottles B to a predetermined level of liquid beverage filling material. Furthermore, the filling device or apparatus comprises an apparatus configured to terminate the filling of bottles upon liquid beverage filling material reaching the predetermined level in bottles B. In other words, the filling arrangements 114 having at least one filling device, element, apparatus, or valve, are configured and disposed to provide a predetermined flow of liquid beverage filling material from the source thereof, such as, product mixers 123 and 124, into the bottles B.

The toroidal vessel 117 is a component, for example, of the revolving rotor 105'. The toroidal vessel 117 can be connected by means of a rotary coupling or a coupling that permits rotation, and by means of the conduit for first product 121 to the external reservoir or first product mixer 123 to supply the product.

As well as the more typical filling machines having one toroidal vessel, it is possible that in at least one possible embodiment a filling machine could possibly be utilized wherein each filling arrangement 114 having at least one filling device, element, apparatus, or valve is preferably connected by means of two connections to a toroidal vessel 117 which contains a first product, say by means of a first connection, for example, the conduit for first product 121, and to a second toroidal vessel which contains a second product, say by means of the second connection, for example, the conduit for second product 122. In this case, each filling arrangement 114 having at least one filling device, element, apparatus, or valve can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly or system of a bottling plant is illustrated in FIG. 1A, the disclosure is equally applicable to single-product installations, or other commensurate embodiments.

FIG. 1A further shows a packaging machine 207A to package the bottles B received from either the conveyor arrangement 110 or the conveyor arrangement 109. The packaging machine pakages the bottles B into individual packages, such as six-, eight-, ten-, twelve-, and 24-packs. The individual packages are then moved into a separating, synchronizing, and compacting device 200A which arranges the individual packages in a desired manner. The individual packages are then moved to a machine 208A to box the individual packages.

Figure 1B:
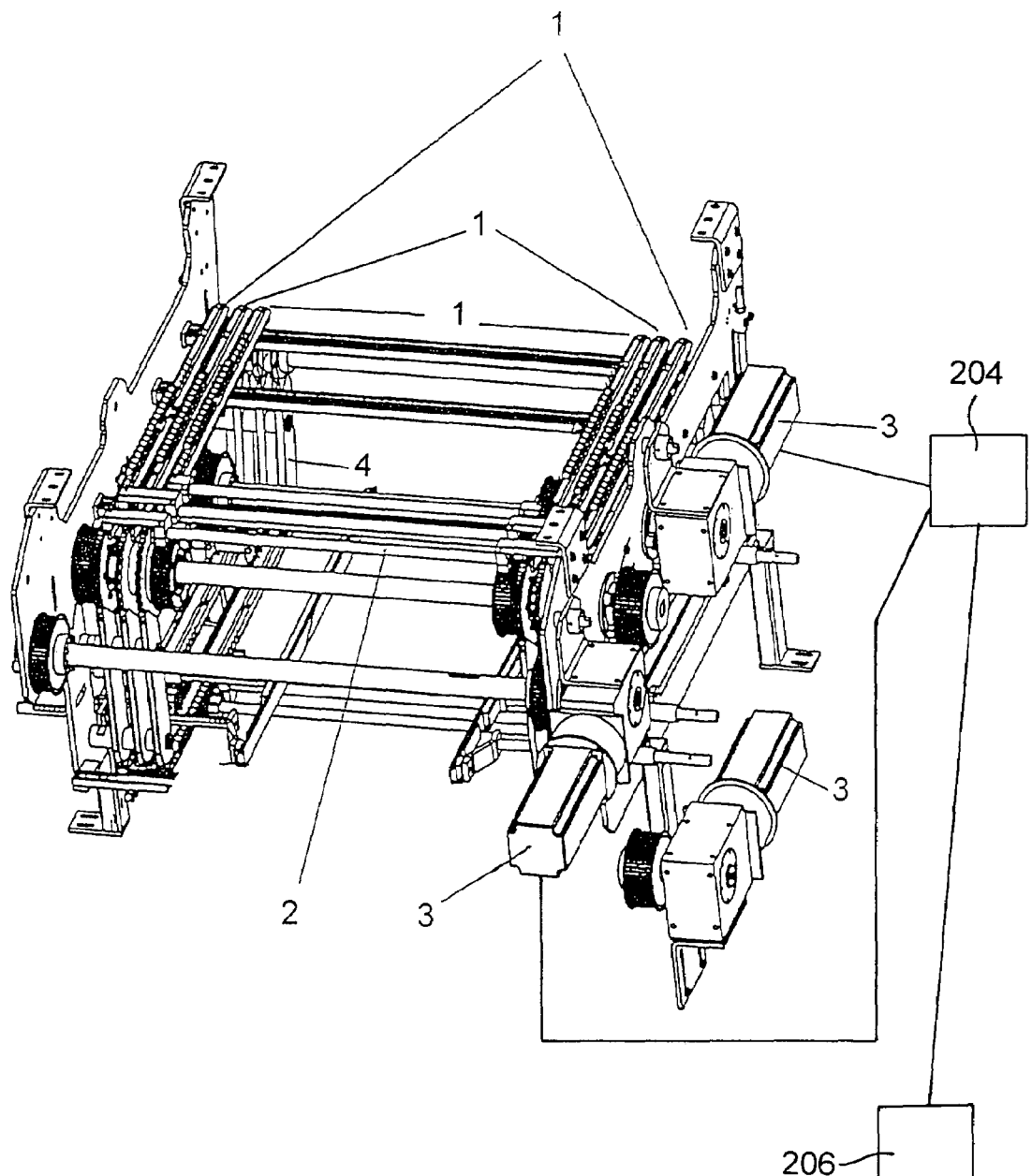
FIG. 1B shows the device in FIG. 1 with additional features according to one possible embodiment.
Figure 1:
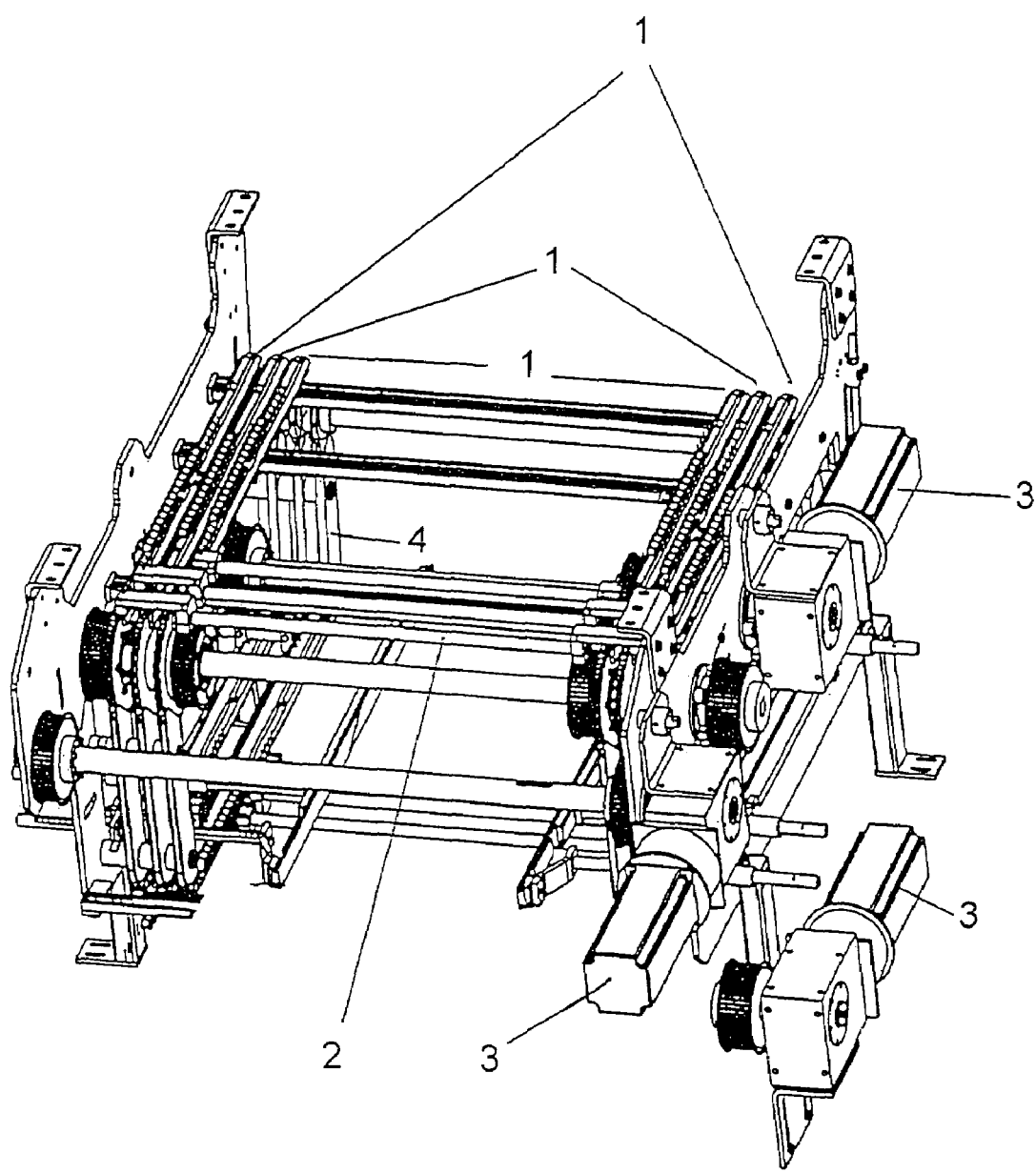
FIG. 1 is a simplified view in perspective of a device as claimed by the present application.

As shown in FIGS. 1 and 1B, for a separating and synchronization station 200 (see FIG. 3) as claimed by the present application, there is at least one pair of drive elements 1, on which at least one crossbar 2 is located.

These drive elements can be chains, for example, that are made of metal or any other suitable materials, in particular roller link chains. Toothed belts can also be used, whereby in particular toothed belts are used to which the above mentioned crossbar 2 can be fastened by means of suitable components.

In this context, the pair of drive elements 1 means drive elements that are driven by a common drive motor, and whereby one of these drive elements 1 is located to the left and one of these drive elements 1 to the right of the path of the group of articles to be divided or already divided.

In the exemplary embodiment illustrated in FIG. 1, roller link chains were selected as the drive elements 1. A total of three pairs of circulating drive elements 1 were installed, whereby two crossbars 2 are mounted on each drive element 1.

The realization of variants with numbers of pairs of drive elements 1 and numbers of crossbars 2 that are different from the numbers in the illustrated exemplary embodiment would still be within the scope of this application.

Each of the pairs of drive elements 1 is driven by its own motor 3, whereby this motor can be an electrically operated stepper motor, servomotor or synchronous motor, for example. What all these types of motors have in common is that the angle of rotation, the direction of rotation and the speed of rotation are specified by a computer or another suitable control device, and the maintenance of these specified values can be monitored by suitable monitoring devices such as a shaft encoder, for example, and transmitted for subsequent analysis.

For the actuation and/or operation of these motors, the speed of rotation and/or the direction of rotation of the motor and thus also the speed of movement and/or the direction of movement of the pair of drive elements 1 driven by this motor can be adjusted to specified setpoints even within a whole rotation or a half rotation of the drive elements 1. The present application also teaches that the speed of movement of the drive elements 1 can also reach the value zero m/s, whereby this value of the speed is not only automatically assumed during a possible change in the direction of movement, but can also be specified for a certain interval of time.

The length of an operating cycle is determined by the number of crossbars 2 that are mounted on a pair of drive elements 1. If only one crossbar 2 is installed, an operating cycle corresponds to one rotation of the drive elements 1. On the other hand, if two crossbars 2 are installed, one work cycle corresponds to half a rotation of the drive elements 1.

In the illustrated exemplary embodiment, the device is designed and constructed so that the individual drive elements 1, because of the crossbars 2 that are located in a common vertical level, cannot pass each other. In an additional configuration of this embodiment, the drive elements 1 and/or crossbars 2 are arranged so that they can pass each other.

FIG. 1B is similar to the embodiment shown in FIG. 1. The embodiment shown in FIG. 1B comprises a control mechanism and computer 204 for operating this embodiment. The embodiment shown in FIG. 1B further comprises a data input arrangement 206, such as a push button arrangement. In operation, the computer control mechanism 204 is operatively connected to the motors 3. The computer control mechanism 204 is programmed to monitor and control the operation of the motors 3 in order to produce desired movement of the drive elements 1 and the crossbars 2. The data input arrangement 206 provides a user with an interface to input program commands to the computer control mechanism 204 in order to permit the separating and synchronizing device 200 to handle packages of various sizes, and possibly even various shapes. For example, the device 200 could be operatively connected to a packaging system that generates packages of different shapes and sizes. Therefore, during operation of the device 200, it may become necessary to alter the movement of the crossbars 2 to handle a new series of individual packages that are of a different size or shape than the previous packages. In such a situation, a worker monitoring the operation of the device 200 could press a button, for example, on the data input arrangement 206 that initiates a program in the computer control mechanism 204 that is specific to the particular package size or shape. The computer control mechanism 204 then adjusts the operation of the motors 3 according to the selected program, and thereby adjusts the movement of the drive elements 1 and crossbars 2 to handle the new series of packages entering the device 200.

In FIG. 2, in the individual illustrations 2a to 2g show a particularly advantageous sequence of movement of an embodiment. To simplify the illustration, the articles to be packed, which in this exemplary embodiment can be bottles, for example, are not shown individually. Instead, only the envelopes of the groups of articles that have already been separated or are to be separated are shown (e.g. FIG. 2a, items B and C, or FIG. 2d, items C and D).

In FIG. 2, a detailed illustration of the three drive elements 1 has been omitted, and only the path of movement 4 of the drive elements 1 is shown in the form of a schematic diagram. The crossbars 2 that are fastened to the three drive elements 1 are identified to show their correspondence to the individual drive elements 1. For example, the crossbars 2 identified as K2 are fastened to the second drive element 1 and the crossbars 2 identified as K3 correspond to the third drive element 1.

The articles to be separated and synchronized are fed to the separation, synchronization and compacting device 200 by an inlet conveyor 5, whereby the articles are held continuously under dynamic pressure inside the separator unit by the continuous motion of the inlet conveyor 5 and thus have a constant tendency to move in the desired direction.

Inside the device, the articles are first pushed by the inlet conveyor 5 onto a stationary, i.e. non-moving component, e.g. a plate 8. Underneath this plate is a hold-back wedge 7 which executes a controlled sequence of movements. This sequence of movements consists of a forward and backward movement at differing, not necessarily constant speeds, and optionally including additional defined immobile phases.

The main conveyor 6 is adjacent to the plate 8 and/or the hold-back wedge 7. This main conveyor 6 is operated at a constant speed, which is higher than the speed of the inlet conveyor 5.

The essential components of the sequence of movement of a device as claimed by the present application are explained in greater detail below, although the description is provided exclusively for purposes of illustration and is not intended to limit or restrict the scope of the present application in any way. Variations of the described or illustrated sequence of movement as well as the omission or inclusion of movements and/or components would still be within the scope of protection of present application.

Figure 2A:
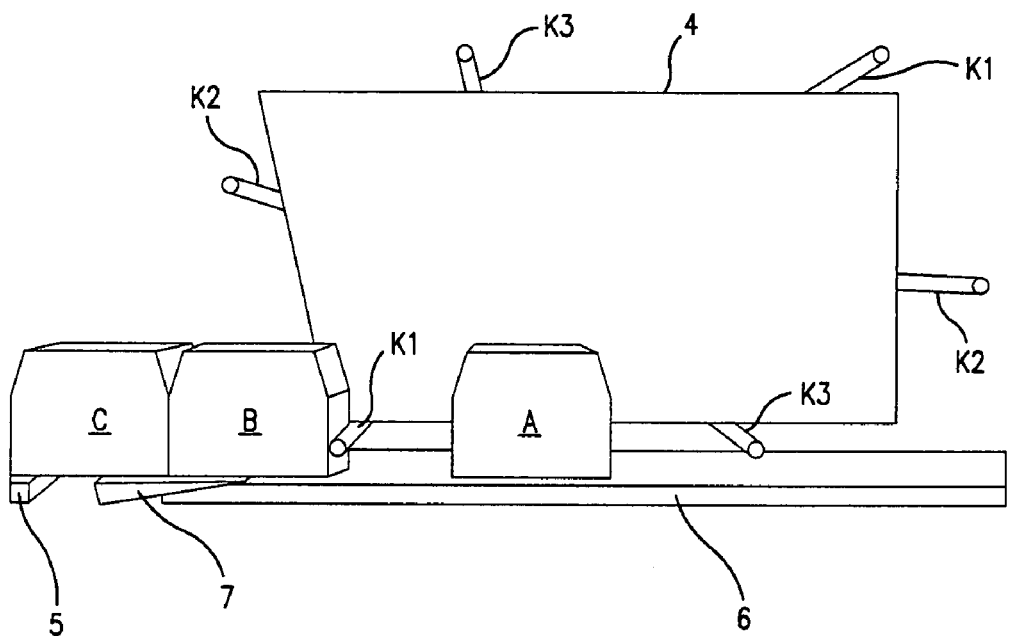
FIGS. 2a to 2g are simplified illustrations of the sequence of movements of the device taught by the present application.
Figure 2B:
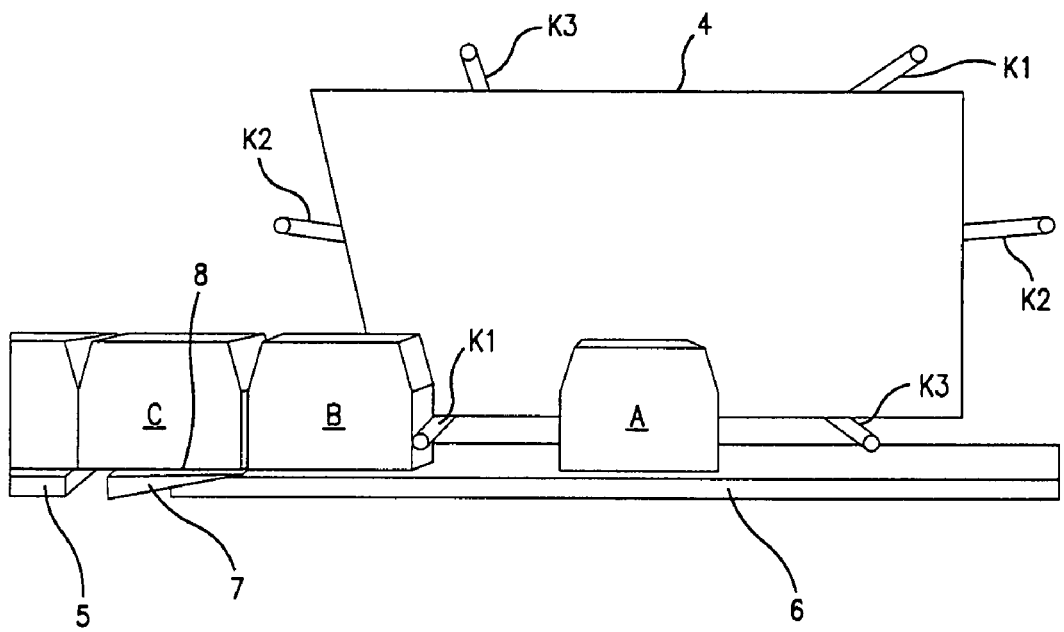
Figure 2C:
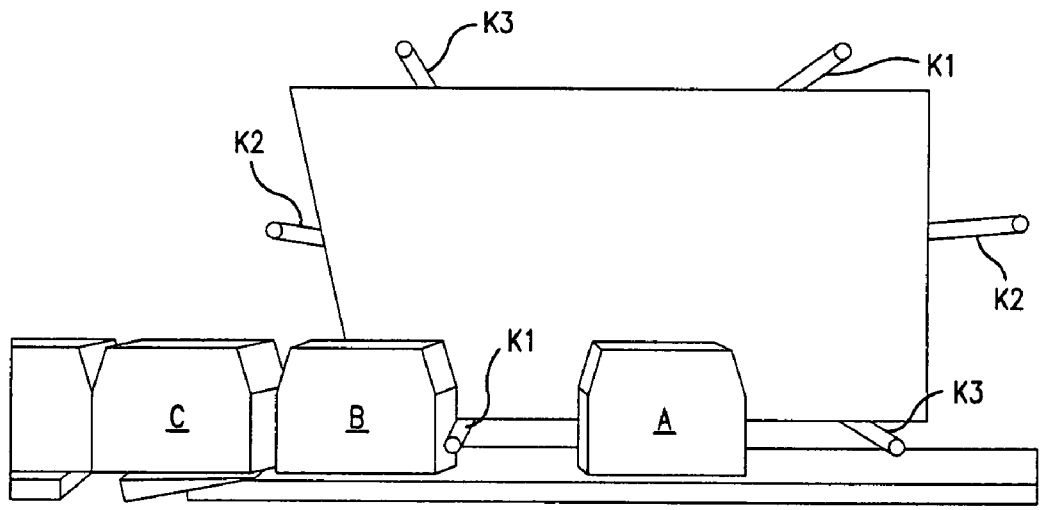
Figure 2D:
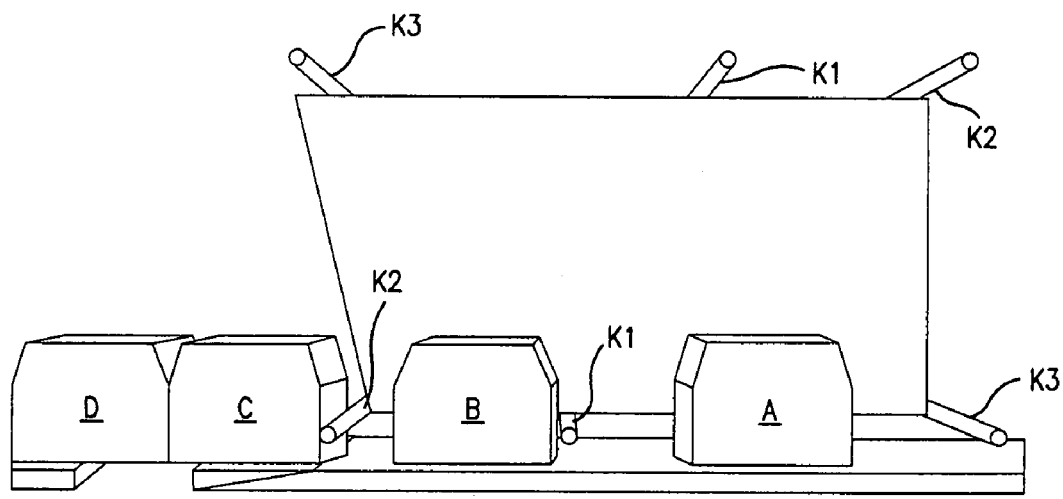

As illustrated in FIG. 2a, the following article stream is held under dynamic pressure by the inlet conveyor 5, so that the groups of articles B and C to be separated subsequently can be adjacent to each other without any gaps. For the actual separation, the hold-back wedge 7 performs a very important function. During the forward movement of the article stream, the hold-back wedge 7 is also extended, and holds back the group of articles B to be separated during this forward movement, which prevents this group of articles from coming into contact with the main conveyor 6.

The contact of the article group B to be separated with the main conveyor 6 must be prevented for the time being, because the main conveyor 6 is operated at a higher belt speed than the inlet conveyor 5, and on account of the speed difference, premature contact would result in the premature and thus undesirable formation of a gap inside the group of articles to be separated.

If the length of the group of articles to be separated is greater than the effective length of the hold-back wedge 7, i.e. if a portion of the group of articles is already on the main conveyor 6, the crossbar K1 which moves at the speed of the inlet conveyor 5 prevents the formation of a gap inside this group of articles.

If the article group B to be separated is far enough above or on the main conveyor 6, the hold-back wedge 7 executes a reverse movement, as a result of which the entire article group B to be separated is set down on the main conveyor 6 and thus assumes the higher speed of the main conveyor 6. Because the crossbar K1 at this time also assumes the higher speed of the main conveyor 6, the desired space between article group B and the following article group C is formed.

The backward movement of the hold-back wedge 7 ends at the leading edge of the next article group C to be separated. When this leading edge is reached, the hold-back wedge 7 again follows the forward movement of article group C, whereby it travels at the same speed as article group C (See FIG. 2*b*).

If the space between article group B and C is large enough (see FIGS. 2*c* and 2*d*), the next crossbar 2, in this case K2, is inserted into the space thus formed and prevents the premature formation of a space inside the following article group C, whereby the crossbar K2, after it is inserted into the space, moves essentially at the speed of the inlet conveyor 5 in the direction of forward motion. Simultaneously the hold-back wedge 7 is extended further, whereby it maintains contact with the leading edge of article Group C and prevents this article group from coming into contact with the main conveyor 6.

Once the preceding article group B has been transported a certain distance by the main conveyor, the speed of the corresponding crossbar K1 is increased, as a result of which it moves away from the article group B.

Figure 2E:
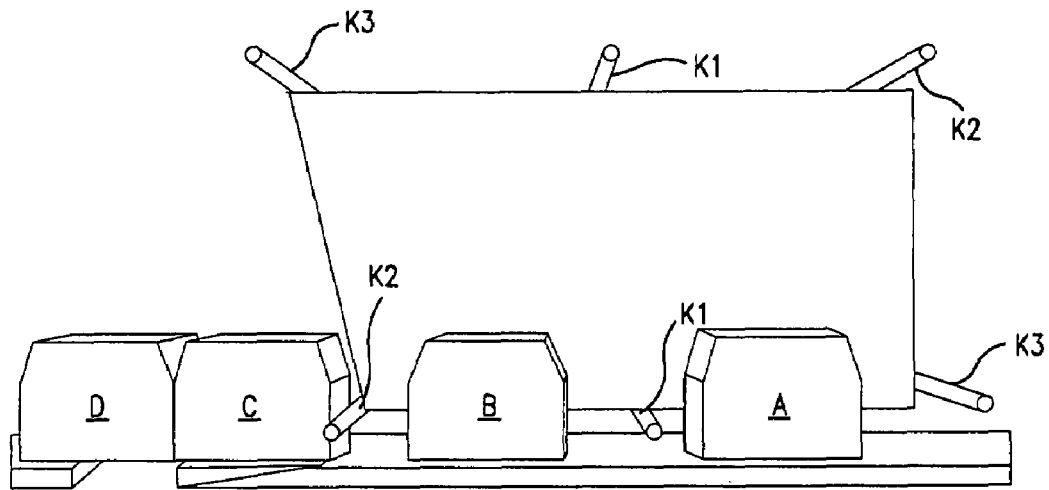
Figure 2F:
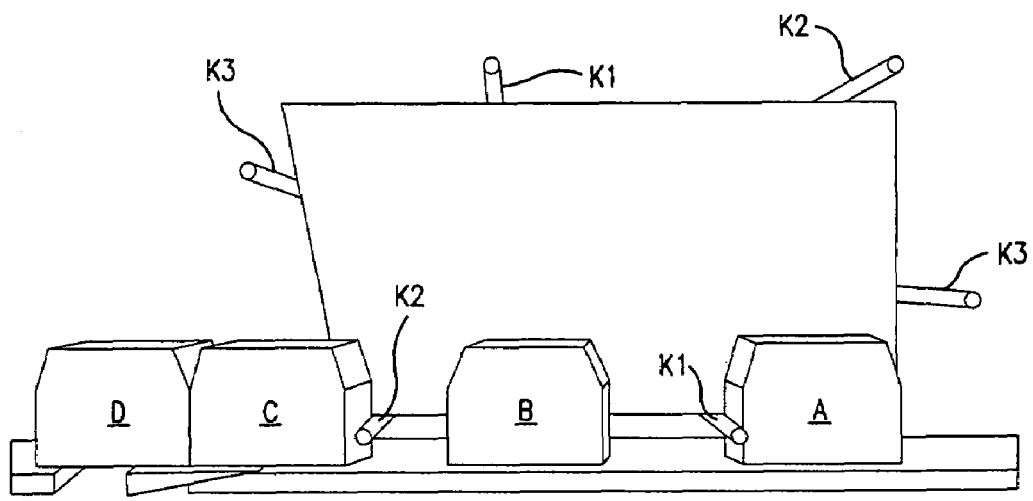
Figure 2G:
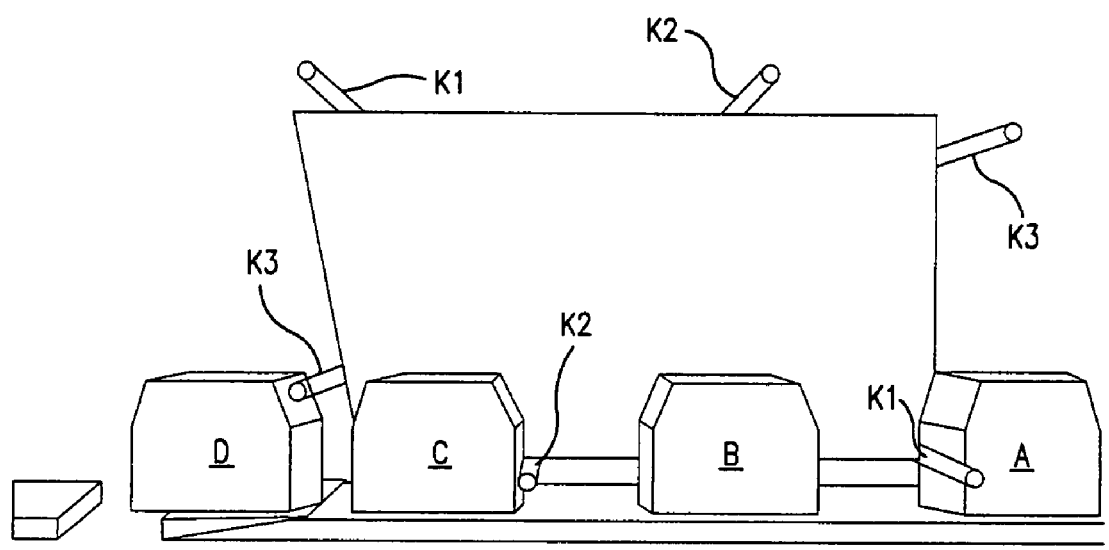

As shown in FIGS. 2*e* and 2*f*, the crossbar K1 is moved at a higher speed than the main conveyor 6 until the crossbar reaches the trailing edge of the preceding article group A. Once it reaches the trailing edge, the crossbar K1 resumes the speed of the main conveyor 6 and pushes the article group A through the compacting unit, which is not shown in the illustration.

These compacting units are part of the prior art and conventionally consist of guide plates that are located on both sides of the path of the article group to form a funnel-shaped bottleneck, as a result of which any gaps that may remain between the transverse rows of the article group are closed. Any gaps that may remain inside the longitudinal rows are closed by pushing the article group onto a stationary component, such as a plate, for example, whereby the crossbar K1 pushes the article group forward.

When the crossbar K1 has then pushed the article group off the stationary component, all the gaps inside the article group have been closed and the article group is correctly positioned and synchronized with the machine cycle. The crossbar is then removed from the plane of the article groups.

Beyond the advantage described above, namely that the separation, synchronization and compacting stations are realized in the form of a single module, the altogether advantageous configuration of the embodiment described above has additional advantages.

For example, it is easy to change the formats to be produced, in particular with a constant number of transverse rows, because to change the number of longitudinal rows, all that is necessary is to change the programmed sequence of movements of the drive chains 1 and hold-back wedge 7, which can practically be done just by "pressing a button" without the need for any mechanical modifications to the packing machine itself.

To realize this function, the present application teaches that the required profile of the movements of the drive elements 1 and hold-back wedge 7 and other control parameters, such as the speeds of the conveyors 5, 6, for example, can be stored in the machine control system for each desired format and/or for each article to be processed, so that relevant data can be easily retrieved by the operating personnel.

The advantages of this embodiment become particularly apparent when there are frequent changes of articles, even when the format remains unchanged, because different articles generally also have different dimensions, which on packing devices of the prior art requires complicated and time-consuming adjustment operations. These complicated changeover operations are practically eliminated altogether on a device of the type claimed by the present application.

As a result of the combination of the functions of separation, synchronization and compacting into a single module, it is possible to significantly reduce the required length of the machine, which in turn makes possible a significant reduction in costs, because of the not-insignificant cost of space.

The embodiment has a further significant advantage: Because, on a device of the type claimed by the present application, it is not necessary to locate components inside the path of the separated article groups, it becomes possible to realize at least the main conveyor 6 in the form of a wide, one-piece conveyor belt that has an essentially uninterrupted surface, which has the advantage over similar arrangements of the prior art, where it is customary to construct the main conveyor 6 from a plurality of narrow conveyor belts that run parallel, that there are no discontinuities in the surface that can cause articles to fall or tip over during transport, or especially during the compacting process.

FIG. 3 shows an embodiment similar to that shown in FIG. 2A, and comprises a packaging machine 207 to package individual articles into individual packages, and a machine 208 to box the individual packages. The embodiment shown in FIG. 3 further comprises a motor and transmission 202 to move the hold-back wedge 7. FIG. 3 also shows the control mechanism and computer 204 and the data input arrangement 206. The computer control mechanism 204 is operatively connected to the motor and transmission 202 to monitor and control the operation thereof, and thereby monitor and control the operation of the hold-back wedge 7.

To further explain, in at least one possible embodiment, the hold-back wedge 7 is initially located under the plate 8, which plate 8 connects the inlet conveyor 5 and the main conveyor 6. Each individual article group or pack is pushed across the plate 8 by the article group or pack immediately behind and in contact with it. As the leading edge of an article group or pack approaches the end of the plate 8, and substantially simultaneously the beginning of the main conveyor 6, it is important that the article group or pack temporarily be prevented from contacting the main conveyor 6 to prevent the article group or pack from being pulled away prematurely by the conveyor 6. The hold-back wedge 7, in at least one possible embodiment, moves forward at essentially the same speed as the article group or pack traveling across the plate 8. The hold-back wedge 7 can act essentially as an extension of the plate 8 and support the article group or pack over the main conveyor 6. In at least one possible embodiment, once an appropriate amount of time has elapsed to allow a preceding article group or pack to move forward on the main conveyor 6, the hold-back wedge 7, in at least one embodiment, retracts back under the plate 8, thereby allowing the article group or pack to make contact with the main conveyor 6. The hold-back wedge 7, in at least one embodiment, contacts an inclined surface 7A (see FIG. 3) on or adjacent the end of the main conveyor 6, such that as the hold-back wedge 7 moves forward with an article group or pack, the hold-back wedge 7 contacts the inclined surface 7A and is inclined or raised very slightly in a vertical direction to prevent the article group or pack from contacting the main conveyor 6 prematurely. In at least one other possible embodiment, the hold-back wedge 7 extends like a sheath over the main conveyor 6 to support the article group or pack over the main conveyor 6 to prevent premature contact. In at least one other possible embodiment, the plate 8 and the hold-back wedge 7 form a single structure that moves back and forth to permit movement of the article group or packs from the inlet conveyor 5 to the main conveyor 6. In that embodiment, there is a gap between the two conveyors 5, 6, and the hold-back wedge 7 moves back to initially support an article group or pack C, then moves forward with the pack C to hold the pack C over the main conveyor 6. The article group or pack D, which is immediately behind and in contact with the article group or pack C on the hold-back wedge 7, can be held in place in a clamping manner by being pressed against pack C by either another pack behind pack D or by the driving force of the inlet conveyor 5.

One feature or aspect of an embodiment is believed at the time of the filing of this patent application to possibly reside broadly in a separating, synchronization and compacting device for packing articles of all types with at least one circulating pair of drive elements, with at least one crossbar that is located on each pair of drive elements, with one controlled drive motor for each pair of drive elements, characterized by the fact that the device is designed and constructed so that the separation, synchronization and compacting of the articles are performed by the at least one pair of drive elements.

Another feature or aspect of an embodiment is believed at the time of the filing of this patent application to possibly reside broadly in a device, characterized by the fact that located on the device are means that make possible a controlled sequence of movements, including different speeds, of the at least one pair of drive elements and/or of the at least one crossbar.

Yet another feature or aspect of an embodiment is believed at the time of the filing of this patent application to possibly reside broadly in a device, characterized by the fact that the device is designed and constructed so that the crossbars that are located on different pairs of drive elements cannot pass one another.

Still another feature or aspect of an embodiment is believed at the time of the filing of this patent application to possibly reside broadly in a device, characterized by the fact that the device is designed and constructed so that the crossbars that are located on different pairs of drive elements can pass one another.

A further feature or aspect of an embodiment is believed at the time of the filing of this patent application to possibly reside broadly in a device, characterized by the fact that the at least one pair of drive elements are chains.

Another feature or aspect of an embodiment is believed at the time of the filing of this patent application to possibly reside broadly in a device, characterized by the fact that the at least one pair of drive elements are toothed belts.

Yet another feature or aspect of an embodiment is believed at the time of the filing of this patent application to possibly reside broadly in a device, characterized by the fact that the device includes a hold-back wedge that can move forward and backward.

Still another feature or aspect of an embodiment is believed at the time of the filing of this patent application to possibly reside broadly in a device, characterized by the fact that the device includes means that make it possible for the hold-back wedge to execute forward and backward movements at different controlled speeds.

A further feature or aspect of an embodiment is believed at the time of the filing of this patent application to possibly reside broadly in a device, characterized by the fact that the device includes an inlet conveyor and a main conveyor.

Another feature or aspect of an embodiment is believed at the time of the filing of this patent application to possibly reside broadly in a device, characterized by the fact that both the inlet conveyor and the main conveyor are each equipped with their own drive motor.

Yet another feature or aspect of an embodiment is believed at the time of the filing of this patent application to possibly reside broadly in a device, characterized by the fact that the main conveyor is realized in the form of a wide, one-piece conveyor belt that has an essentially uninterrupted surface.

Still another feature or aspect of an embodiment is believed at the time of the filing of this patent application to possibly reside broadly in a method for the operation of a device, characterized by the fact that the sequence of motion of the at least one pair of drive elements and/or of the at least one crossbar includes different speeds during a single work cycle.

A further feature or aspect of an embodiment is believed at the time of the filing of this patent application to possibly reside broadly in a method, characterized by the fact that the at least one crossbar first holds the article group to be separated back in relation to the main conveyor, then is moved forward at an increased speed, after it reaches the previously separated article group synchronizes the article group with the working speed of the device and then pushes this article group through a compacting unit.

Another feature or aspect of an embodiment is believed at the time of the filing of this patent application to possibly reside broadly in a method, characterized by the fact that the at least one crossbar, after the separation of an article group, is first moved at a speed similar to that of the main conveyor, is then moved forward at a higher speed, and is then moved farther at a speed similar to that of the main conveyor.

Yet another feature or aspect of an embodiment is believed at the time of the filing of this patent application to possibly reside broadly in a method, characterized by the fact that the device can be adjusted to changing formats and/or changing article sizes, with an unchanging number of transverse rows, simply by changing the control parameters inside the control program and or the control system of the device.

Still another feature or aspect of an embodiment is believed at the time of the filing of this patent application to possibly reside broadly in a method, characterized by the fact that the relevant control parameters for each format and/or article size can be stored and retrieved as required.

A further feature or aspect of an embodiment is believed at the time of the filing of this patent application to possibly reside broadly in a method, characterized by the fact that the hold-back wedge executes a forward movement and a backward movement.

Another feature or aspect of an embodiment is believed at the time of the filing of this patent application to possibly reside broadly in a method, characterized by the fact that the hold-back wedge executes the forward movement at a first speed and the backward movement at a second speed.

A further feature or aspect of an embodiment is believed at the time of the filing of this patent application to possibly reside broadly in a method, characterized by the fact that the first speed and the second speed are the same.

A further feature or aspect of an embodiment is believed at the time of the filing of this patent application to possibly reside broadly in a method characterized by the fact that the inlet conveyor and the main conveyor are each operated at their own speeds which are independent of each other.

In one possible embodiment, the separating and compacting system described above could be used for any types of packs, packages, or articles that are to be boxed, packaged, or conglomerated into one unit.

The components disclosed in the various publications, disclosed or incorporated by reference herein, may possibly be used in possible embodiments of the present invention, as well as equivalents thereof.

The Innopack packaging machine, manufactured by KHS Maschinen und Anlagenbau A G, is an example of a packaging machine which may possibly be utilized or adapted for use in at least one possible embodiment. Some other examples of packaging machines which may possibly be utilized or adapted for use in at least one possible embodiment may possibly be found in the following U.S. Pat. No. 4,964,260, entitled "Packaging machine for cardboard boxes and process for packaging articles in cardboard boxes;" U.S. Pat. No. 4,785,610, entitled "Automatic machine for packaging products of different kinds in boxes;" U.S. Pat. No. 5,265,398, entitled "Automatic counting and boxing machine;" U.S. Pat. No. 5,943,847, entitled "Packaging machine for multi-packs;" U.S. Pat. No. 5,937,620, entitled "Packaging machine for multi-packs;" U.S. Pat. No. 5,711,137, entitled "Packaging machine and method of packaging articles;" and U.S. Pat. No. 5,706,633, entitled "Packaging machine and method of packaging articles."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of bottling systems that may possibly be utilized or possibly adapted for use in at least one possible embodiment of the present application may possibly be found in the following U.S. patents, all assigned to the Assignee herein: U.S. Pat. No. 4,911,285; U.S. Pat. No. 4,944,830; U.S. Pat. No. 4,950,350; U.S. Pat. No. 4,976,803; U.S. Pat. No. 4,981,547; U.S. Pat. No. 5,004,518; U.S. Pat. No. 5,017,261; U.S. Pat. No. 5,062,917; U.S. Pat. No. 5,062,918; U.S. Pat. No. 5,075,123; U.S. Pat. No. 5,078,826; U.S. Pat. No. 5,087,317; U.S. Pat. No. 5,110,402; U.S. Pat. No. 5,129,984; U.S. Pat. No. 5,167,755; U.S. Pat. No. 5,174,851; U.S. Pat. No. 5,185,053; U.S. Pat. No. 5,217,538; U.S. Pat. No. 5,227,005; U.S. Pat. No. 5,413,153; U.S. Pat. No. 5,558,138; U.S. Pat. No. 5,634,500; U.S. Pat. No. 5,713,403; U.S. Pat. No. 6,276,113; U.S. Pat. No. 6,213,169; U.S. Pat. No. 6,189,578; U.S. Pat. No. 6,192,946; U.S. Pat. No. 6,374,575; U.S. Pat. No. 6,365,054; U.S. Pat. No. 6,619,016; U.S. Pat. No. 6,474,368; U.S. Pat. No. 6,494,238; U.S. Pat. No. 6,470,922; and U.S. Pat. No. 6,463,964.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of sensors that may possibly be utilized or possibly adapted for use in at least one possible embodiment of the present application may possibly be found in the following U.S. Pat. No. 6,062,248 issued to Boelkins on May 16, 2000; U.S. Pat. No. 6,223,593 issued to Kubisiak et al. on May 1, 2001; U.S. Pat. No. 6,466,035 issued to Nyfors et al. on Oct. 15, 2002; U.S. Pat. No. 6,584,851 issued to Yamagishi et al. on Jul. 1, 2003; U.S. Pat. No. 6,631,638 issued to James et al. on Oct. 14, 2003; and U.S. Pat. No. 6,707,307 issued to McFarlane et al. on Mar. 16, 2004.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025 issued to Yasui on Feb. 15, 2000.

The corresponding foreign and international patent publication applications, namely, Federal Republic of Germany Patent Application No. 103 47 540.0, filed on Oct. 10, 2003, having inventors Stefan Wagner, Stefan Willemsen, Bernd Cox, and Manfred van Triel, and DE-OS 103 47 540.0 and DE-PS 103 47 540.0, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of bottling systems which may possibly be utilized or adapted for use in at least one possible embodiment may possibly be found in the following U.S. Pat. No. 6,684,602, entitled "Compact bottling machine;" U.S. Pat. No. 6,470,922, entitled "Bottling plant for bottling carbonated beverages;" U.S. Pat. No. 6,390,150, entitled "Drive for bottling machine;" U.S. Pat. No. 6,374,575, entitled "Bottling plant and method of operating a bottling plant;" U.S. Pat. No. 6,192,946, entitled "Bottling system;" U.S. Pat. No. 6,185,910, entitled "Method and an apparatus for high-purity bottling of beverages;" U.S. Pat. No. 6,058,985, entitled "Bottling machine with a set-up table and a set-up table for a bottling machine and a set-up table for a bottle handling machine;" U.S. Pat. No. 5,996,322, entitled "In-line bottling plant;" U.S. Pat. No. 5,896,899, entitled "Method and an apparatus for sterile bottling of beverages;" U.S. Pat. No. 5,848,515, entitled "Continuous-cycle sterile bottling plant;" U.S. Pat. No. 5,634,500, entitled "Method for bottling a liquid in bottles or similar containers;" and U.S. Pat. No. 5,425,402, entitled "Bottling system with mass filling and capping arrays."

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of labeling machines which may possibly be utilized in at least one possible embodiment may possibly be found in the following U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,543,514, entitled "In-line continuous feed sleeve labeling machine and method;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,263,940, entitled "In-line continuous feed sleeve labeling machine and method;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

The details in the patents, patent applications and publications may be considered to be incorporable, at applicant's option, into the claims during prosecution as further limitations in the claims to patentably distinguish any amended claims from any applied prior art.

Some examples of starwheels which may possibly be utilized or adapted for use in at least one possible embodiment may possibly be found in the following U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of centering devices for bottle handling devices which may possibly be utilized or adapted for use in at least one possible embodiment may possibly be found in Federal Republic of Germany Application No. DE P 103 14 634, entitled "Spulbares Huborgan" having inventor Herbert Bernhard, and its U.S. equivalent, having Ser. No. 10/813,657, entitled "A beverage bottling plant for filling bottles with a liquid beverage filling material, and an easily cleaned lifting device in a beverage bottling plant" and filed on Mar. 30, 2004; Federal Republic of Germany Application No. DE P 103 08 156, entitled "Huborgan zum Anpressen von Gefassen an Gefassfullmaschinen" having inventor Herbert Bernhard, and its U.S. equivalent, Ser. No. 10/786,256, entitled "A beverage bottling plant for filling bottles with a liquid beverage filling material, and a container filling lifting device for pressing containers to container filling machines", filed on Feb. 25, 2004; and Federal Republic of Germany Application No. P 103 26 618.6, filed on Jun. 13, 2003, having inventor Volker TILL, and its U.S. equivalent, Ser. No. 10/865,240, filed on Jun. 10, 2004 and having Attorney Reference No. NHL-HOL-72. The above applications are hereby incorporated by reference as if set forth in their entirety herein.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

Some examples of wrapping machines which may possibly be utilized or adapted for use in at least one possible embodiment may possibly be found in the following U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of operating a separating, synchronization and compacting device for packing articles of all types with at least one circulating pair of drive elements (1), with at least one crossbar (2) that is located on each pair of drive elements (1), with one controlled drive motor (3) for each pair of drive elements (1), wherein the device is designed and constructed so that the separation, synchronization and compacting of the articles are performed by the at least one pair of drive elements (1), wherein the sequence of motion of the at least one pair of drive elements (1) and/or of the at least one crossbar (2) includes different speeds during a single work cycle, and the method comprises moving the at least one pair of drive elements (1) and/or of the at least one crossbar (2) at different speeds during a single work cycle.

2. The method according to claim 1, wherein one of (A) and (B):

(A) the at least one crossbar (2) first holds the article group to be separated back in relation to a main conveyor 6, then is moved forward at an increased speed, after it reaches the previously separated article group synchronizes the article group with the working speed of the device and then pushes this article group through a compacting unit; and (B) the at least one crossbar (2), after the separation of an article group, is first moved at a speed similar to that of a main conveyor (6), is then moved forward at a higher speed, and is then moved farther at another speed similar to that of the main conveyor (6).

3. The method according to claim 2, wherein the device can be adjusted to changing formats and/or changing article sizes, with an unchanging number of transverse rows, simply by changing control parameters inside the control program and or a control system of the device.

4. The method according to claim 3, wherein the relevant control parameters for each format and/or article size can be stored in and retrieved from a computer control system as required.

5. The method according to claim 4, wherein a hold-back wedge (7) executes a forward movement and a backward movement.

6. The method according to claim 5, wherein the hold-back wedge (7) executes the forward movement at a first speed and the backward movement at a second speed.

7. The method according to claim 6, wherein the first speed and the second speed are the same, and an inlet conveyor (5) and the main conveyor (6) are each operated at their own speeds which are independent of each other.

8. A method of separating, synchronizing and compacting packed groups of articles of all types, such as packages, containers, bottles, cans, boxes, and bags, said method comprising the steps of:

conveying a first group of articles on top of a first conveyor belt at a first speed to a separating mechanism;

receiving and holding a first group of articles on said separating mechanism;

unloading the first group of articles onto a second conveyor belt;

conveying the first group of articles on said second conveyor belt at a second speed which is higher than the first speed of said first conveyor belt to thus create a gap between the first group of articles and a subsequent second group of articles;

conveying the second group of articles on top of said first conveyor belt at a first speed to said separating mechanism;

receiving and holding the second group of articles on said separating mechanism;

moving a first crossbar with a corresponding drive motor into the gap between the first group of articles and the second group of articles, wherein the first crossbar is one of: in contact with the second group of articles, and immediately adjacent the second group of articles;

unloading the second group of articles onto said second conveyor belt, and substantially simultaneously moving said first crossbar forward at a third speed similar to said second speed of said second conveyor ahead of the second group of articles in the direction of movement of said second conveyor;

conveying the second group of articles on said second conveyor belt at said second speed and creating a gap between the second group of articles and a subsequent third group of articles, and substantially simultaneously moving said first crossbar forward at a fourth speed greater than said second speed of said second conveyor and away from the second group of articles and toward the first group of articles;

moving said first crossbar forward at said fourth speed until said first crossbar reaches the first group of articles disposed ahead of said crossbar in the direction of movement of said second conveyor, then decreasing the speed of movement of said first crossbar back to said third speed; and moving said first crossbar forward at said third speed to push the first group of articles off of said second conveyor and into a packaging device.

9. The method according to claim 8, wherein said step of moving said first crossbar into the gap between the first and second groups of articles comprises contacting and holding the second group of articles back in relation to said second conveyor.

10. The method according to claim 9, wherein said separating mechanism comprises a wedge, and said steps of receiving, holding, and unloading a group of articles comprise:

receiving a group of articles on said wedge;

moving said wedge forward toward said second conveyor with the group of articles thereon; and moving said wedge backward away from said second conveyor and thus unloading the group of articles onto said second conveyor.

11. The method according to claim 10, said steps of moving said wedge comprise moving said wedge forward at a first speed and backward at a second speed which is one of: the same as or different from the first speed.

12. The method according to claim 11, wherein each of said first and second conveyors comprises a conveyor belt having an upper surface on top of which the groups of articles are placed and conveyed.

13. The method according to claim 12, wherein the different speeds of movement of said first crossbar can be adjusted by its corresponding drive motor to changing formats and/or changing article sizes, with an unchanging number of transverse rows, by changing the control parameters inside a control program and or a control system.

14. The method according to claim 13, wherein the relevant control parameters for each format and/or article size can be stored in a control program and retrieved as required.

15. The method according to claim 8, wherein said step of moving said first crossbar into the gap between said first and second groups of articles comprises moving said first crossbar into a position adjacent but not in contact with the second group of articles.

16. The method according to claim 15, wherein said separating mechanism comprises a wedge, and said steps of receiving, holding, and unloading a group of articles comprise:

receiving a group of articles on said wedge;

moving said wedge forward toward said second conveyor with the group of articles thereon; and moving said wedge backward away from said second conveyor and thus unloading the group of articles onto said second conveyor.

17. The method according to claim 16, said steps of moving said wedge comprise moving said wedge forward at a first speed and backward at a second speed which is one of: the same as or different from the first speed.

18. The method according to claim 17, wherein each of said first and second conveyors comprises a conveyor belt having an upper surface on top of which the groups of articles are placed and conveyed.

19. The method according to claim 18, wherein the different speeds of movement of said first crossbar can be adjusted by it corresponding drive motor to changing formats and/or changing article sizes, with an unchanging number of transverse rows, by changing the control parameters inside a control program and or a control system.

20. The method according to claim 19, wherein the relevant control parameters for each format and/or article size can be stored in a control program and retrieved as required.

* * * * *

EX PARTE REEXAMINATION CERTIFICATE (7661st)

United States Patent
Wagner et al.

(10) Number: US 7,481,309 C1
(45) Certificate Issued: Aug. 3, 2010

(54) METHOD OF SEPARATING, SYNCHRONIZING AND COMPACTING PACKED GROUPS OF ARTICLES

(75) Inventors: Stefan Wagner, Xanten (DE); Stefan Willemsen, Weeze (DE); Bernd Cox, Weeze (DE); Manfred Van Triel, Xanten (DE)

(73) Assignee: KHS Maschinen - und Anlagenbau AG, Dortmund (DE)

Reexamination Request:
No. 90/010,460, Mar. 20, 2009

Reexamination Certificate for:
Patent No.: 7,481,309
Issued: Jan. 27, 2009
Appl. No.: 11/828,883
Filed: Jul. 26, 2007

Related U.S. Application Data

(63) Continuation of application No. 10/962,183, filed on Oct. 8, 2004, now abandoned.

(30) Foreign Application Priority Data
Oct. 10, 2003 (DE) .................................... P 130 47 540

(51) Int. Cl.
*B65G 47/26* (2006.01)

(52) U.S. Cl. ................ 198/419.3; 198/418.1; 198/419.1; 198/429; 198/459.7

(58) Field of Classification Search ........................ None
See application file for complete search history.

(56) References Cited

U.S. PATENT DOCUMENTS

| | | |
|---|---|---|
| 5,271,709 A | 12/1993 | VanderMeer et al. |
| 5,667,055 A | 9/1997 | Gambetti |
| 6,131,372 A | 10/2000 | Pruett |
| 6,843,360 B2 | 1/2005 | Peterman et al. |

*Primary Examiner*—Robert M. Fetsuga

(57) ABSTRACT

A beverage bottling plant for filling bottles with a liquid beverage filling material, having a separating and compacting device for packing articles of all types with at least one circulating pair of drive elements, with at least one crossbar that is located on each pair of drive elements, with one controlled drive motor for each pair of drive elements, whereby the device is designed and constructed so that the separation and compacting of the articles are performed by the at least one pair of drive elements.

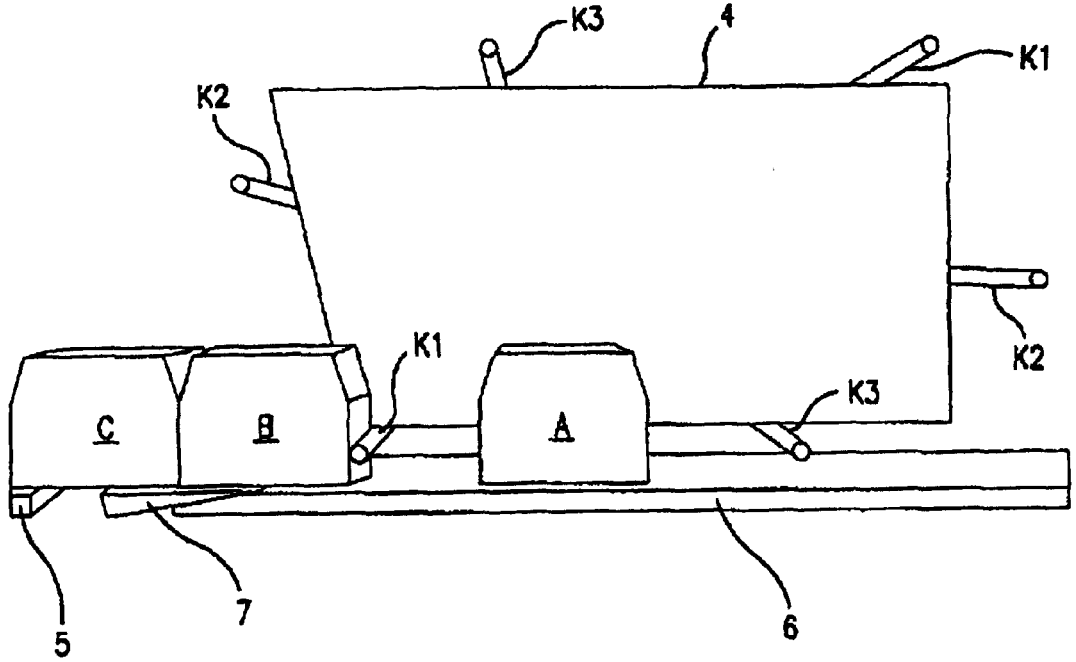

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 5 are cancelled.

Claims 1, 4, 6 and 8 are determined to be patentable as amended.

Claims 7 and 9-20, dependent on an amended claim, are determined to be patentable.

1. A method of operating a separating, synchronization and compacting device for packing articles of all types with at least one circulating pair of drive elements (1), with at least one crossbar (2) that is located on each pair of drive elements (1), with one controlled drive motor (3) for each pair of drive elements (1), wherein the device is designed and constructed so that the separation, synchronization and compacting of the articles are performed by the at least one pair of drive elements (1), wherein the sequence of motion of the at least one pair of drive elements (1) and/or of the at least one crossbar (2) includes different speeds during a single work cycle, and the method comprises moving the at least one pair of drive elements (1) and/or of the at least one crossbar (2) at different speeds during a single work cycle, *and wherein the at least one crossbar (2) comprises a first crossbar, said first crossbar is moved at a speed less than the speed of movement of the main conveyor (6) to first hold a first article group to be separated back in relation to the main conveyor (6), then said first crossbar is moved forward at an increased speed greater than the speed of movement of the main conveyor (6) to move said first crossbar in the direction of movement of the main conveyor (6) away from the first article group and toward a second article group positioned downstream and ahead of both said first crossbar and the first article group on the main conveyor (6), then said first crossbar is slowed down to the speed of movement of the main conveyor upon said first crossbar reaching the second article group, and then said first crossbar pushes and compacts the second article group.*

4. The method according to claim [3] *1*, wherein *the device can be adjusted to changing formats and/or changing article sizes, with an unchanging number of transverse rows, simply by changing control parameters inside the control program and or a control system of the device, and* the relevant control parameters for each format and/or article size can be stored in and retrieved from a computer control system as required.

6. The method according to claim [5] *4*, wherein *after the at least one crossbar reaches the previously separated article group, the at least one crossbar synchronizes the article group with the working speed of the device, and a hold-back wedge (7) executes a forward movement and a backward movement, and* the hold-back wedge (7) executes the forward movement at a first speed and the backward movement at a second speed.

8. A method of separating, synchronizing and compacting packed groups of articles of all types, such as packages, containers, bottles, cans, boxes, and bags, said method comprising the steps of:

conveying a first group of articles on top of a first conveyor belt at a first speed to a separating mechanism;

receiving and holding a first group of articles on said separating mechanism;

unloading the first group of articles onto a second conveyor belt;

conveying the first group of articles on said second conveyor belt at a second speed which is higher than the first speed of said first conveyor belt to thus create a gap between the first group of articles and a subsequent second group of articles;

conveying the second group of articles on top of said first conveyor belt at [a] *the* first speed separating mechanism;

receiving and holding the second group of articles on said said separating mechanism;

moving a first crossbar with a corresponding drive motor into the gap between the first group of articles and the second group of articles, wherein the first crossbar is one of: in contact with the second group of articles, and immediately adjacent the second group of articles;

unloading the second group of articles onto said second conveyor belt, and substantially simultaneously moving said first crossbar forward at a third speed similar to said second speed of said second conveyor ahead of the second group of articles in the direction of movement of said second conveyor;

conveying the second group of articles on said second conveyor belt at said second speed and creating a gap between the second group of articles and a subsequent third group of articles, and substantially simultaneously moving said first crossbar forward at a fourth speed greater than said second speed of said second conveyor and away from the second group of articles and toward the first group of articles;

moving said first crossbar forward at said fourth speed until said first crossbar reaches the first group of articles disposed ahead of said crossbar in the direction of movement of said second conveyor, then decreasing the speed of movement of said first crossbar bar to said third speed; and moving said first crossbar forward at said third speed to push the first group of articles off of said second conveyor and into a packaging device.

* * * * *